United States Patent [19]
Hyde

[11] Patent Number: 6,145,332
[45] Date of Patent: Nov. 14, 2000

[54] APPARATUS FOR PROTECTING PUMPS AGAINST CAVITATION

[75] Inventor: Robert E. Hyde, Portland, Oreg.

[73] Assignee: DTE Energy Technologies, Inc., Detroit, Mich.

[21] Appl. No.: 09/334,073

[22] Filed: Jun. 16, 1999

[51] Int. Cl.[7] ................................................ F25B 17/00
[52] U.S. Cl. .......................................... 62/190; 62/DIG. 2
[58] Field of Search ............................. 62/DIG. 2, 190, 62/498, 118; 340/619, 621, 623

[56] References Cited

U.S. PATENT DOCUMENTS

| | | | |
|---|---|---|---|
| 4,599,873 | 7/1986 | Hyde | 62/498 |
| 5,072,595 | 12/1991 | Barbier | 62/129 |
| 5,386,700 | 2/1995 | Hyde | 62/224 |
| 5,435,148 | 7/1995 | Sandofsky et al. | 62/197 |
| 5,626,025 | 5/1997 | Hyde | 62/117 |
| 5,666,814 | 9/1997 | Yamamoto | 62/118 |
| 5,752,390 | 5/1998 | Hyde | 62/196.4 |

*Primary Examiner*—William Doerrler
*Assistant Examiner*—Marc Norman
*Attorney, Agent, or Firm*—Chernoff, Vilhauer, McClung & Stenzel, LLP

[57] ABSTRACT

Apparatus for protecting a liquid refrigerant pump from damage due to cavitation and loss of lubrication by inclusion of means for detecting the presence of vaporized refrigerant at the pump inlet and deactivating the pump in response thereto.

8 Claims, 5 Drawing Sheets

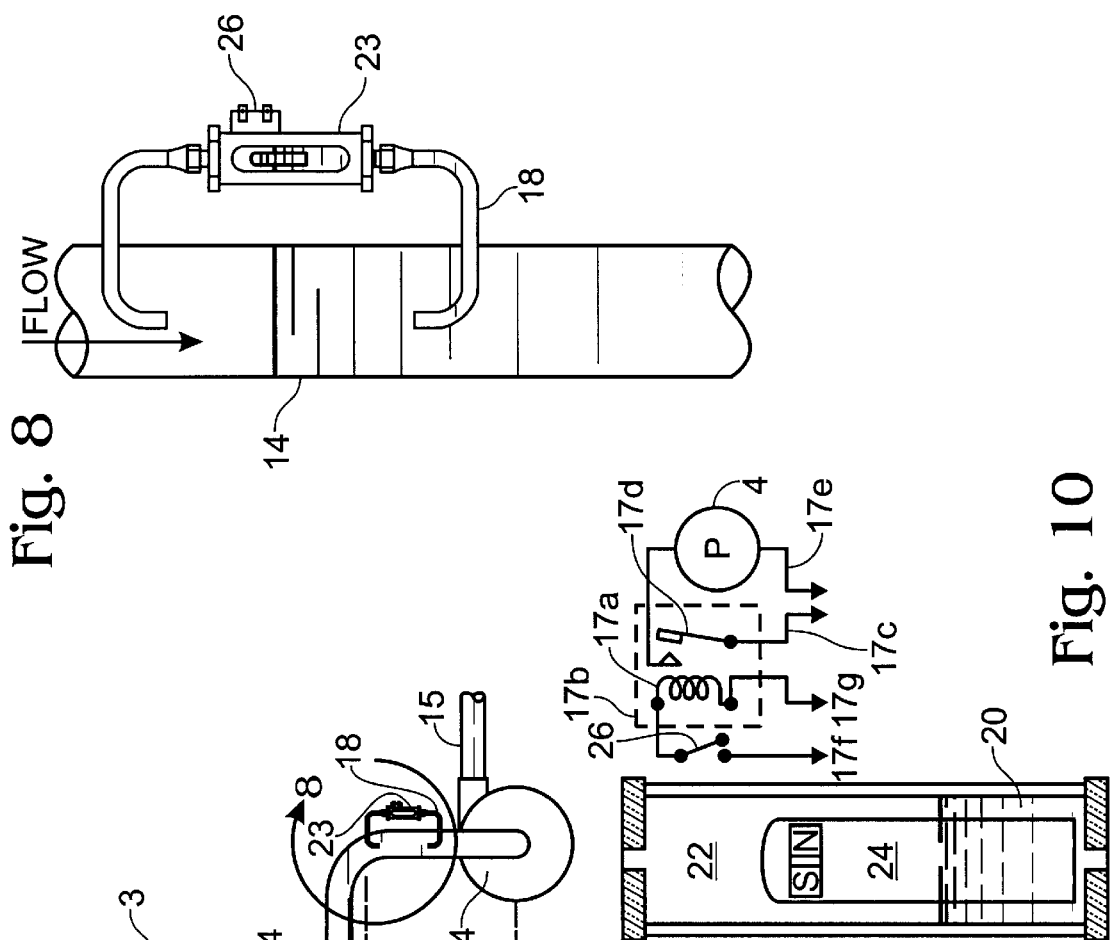
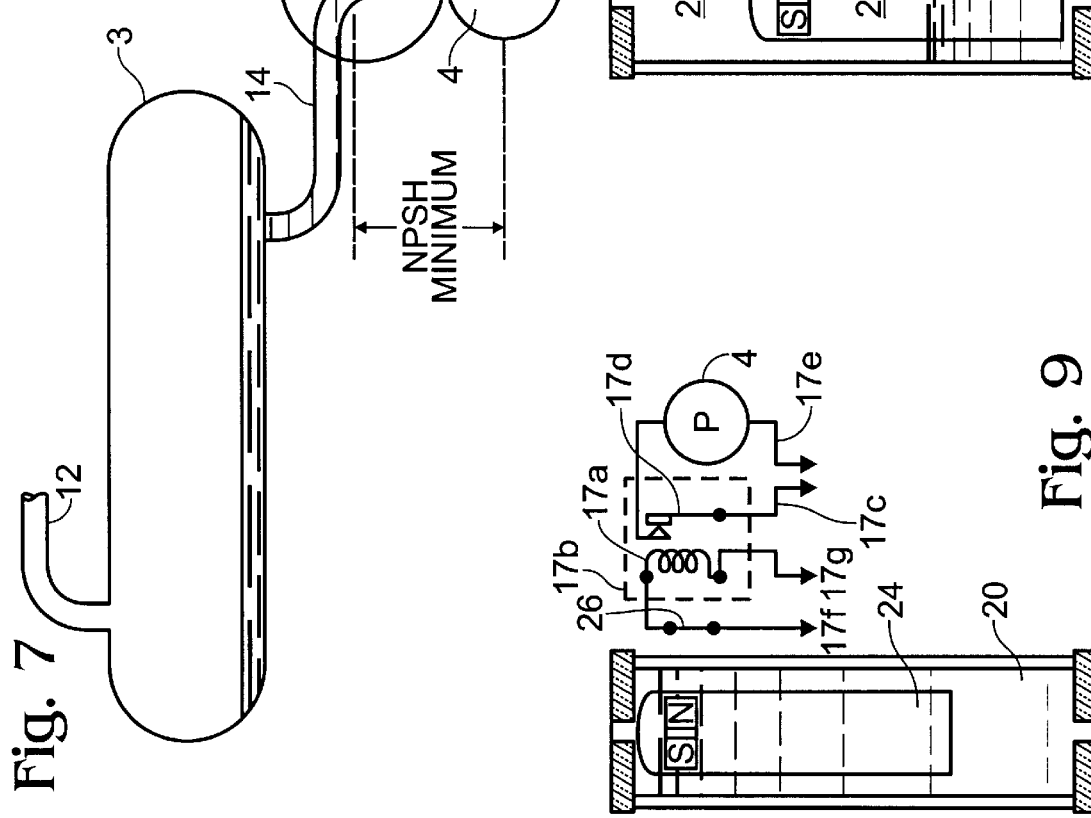

APPARATUS FOR PROTECTING PUMPS AGAINST CAVITATION

BACKGROUND OF THE INVENTION

This invention generally relates to mechanical refrigeration or air conditioning systems having a fluid refrigerant pump, and more particularly to means of protecting the refrigerant pump from damage related to the loss of lubrication and cavitation as a result of vaporous refrigerant entering the pump.

Air conditioning and refrigeration systems generally comprise an evaporator, a condenser, an expansion device, and a compressor. I have previously improved the cooling capacity and efficiency of refrigeration and air conditioning systems by adding a liquid pump at the outlet of the receiver or condenser, as disclosed in my U.S. Pat. No. 4,599,873. The liquid pump boosts the pressure of the condensed refrigerant flowing into the expansion device by 5 p.s.i. or more, a process I call liquid pressure amplification. Liquid pressure amplification suppresses flash gas in refrigerant flowing to the expansion device, provides a uniform flow of liquid refrigerant thereto, substantially increasing cooling capacity and efficiency.

In air conditioning and refrigeration systems which incorporate liquid pressure amplification, sufficient vapor-free liquid refrigerant must be maintained at the inlet to the liquid refrigerant pump so as to prevent vapor from entering the pump. Vapor entering the pump can result in both loss of lubrication and the well-known pumping phenomenon of cavitation, which comprises the sudden collapse of vapor bubbles, resulting in the generation of shock waves which may quickly erode the pump.

Any liquid, including liquid refrigerant, begins to vaporize if the pressure of the liquid drops below its saturation pressure. A liquid is said to be at saturation when its vapor pressure equals its liquid pressure. Any subsequent drop in liquid pressure results in vaporization of the liquid since liquid pressure then exceeds the ambient pressure. Liquid refrigerant typically leaves the condenser at or near saturation. It can then fall below its saturation pressure as it flows through he pump suction line into the pump inlet and while being accelerated along a pump surface inside the pump.

Sound engineering design of systems which incorporate pumps includes providing for a net positive suction head (NPSH) at the pump inlet to minimize the likelihood of the occurrence of cavitation. NPSH refers to the amount by which the liquid pressure at the pump inlet exceeds the saturation pressure of the liquid. The need to provide for sufficient NPSH to prevent cavitation is an important requirement for a refrigeration or air conditioning system which includes a liquid refrigerant pump. The desired NPSH may be achieved by locating the liquid refrigerant pump inlet below the condenser or receiver, and therefore below the normal liquid level in the condenser or receiver. Under normal operating conditions, the resulting "column" of liquid refrigerant provides a NPSH corresponding to the density of liquid refrigerant and the vertical distance from the pump inlet to the liquid level in the receiver or condenser.

Despite a designer's best efforts, it is not possible to ensure that the pump inlet pressure will always meet or exceed the required minimum NPSH. During system operation for example, the liquid level in the condenser or receiver can fall sufficiently to cause the NPSH to fall below the required minimum. Space constraints often do not permit the desired vertical offset between the condenser or receiver and the liquid refrigerant pump inlet. In those instances, it has heretofore not been possible to protect the liquid refrigerant pump against cavitation or loss of lubrication resulting from low inlet pressure or loss of liquid refrigerant entering the pump. A need remains for a way to do so.

This need is met by the present invention, which will be more readily understood upon consideration of the following summary and detailed description, taken in conjunction with the accompanying drawings.

SUMMARY OF THE INVENTION

The present invention provides a solution to the problem of shortfalls of the minimum NPSH in refrigeration or cooling systems that are caused by an unduly low level of liquid refrigerant in the pump. The solution comprises including in an air conditioning or refrigeration system means for detecting the presence of vapor at the inlet of the liquid refrigerant pump, coupled with means for temporarily inactivating the pump when vapor at the pump inlet is detected.

BRIEF DESCRIPTION OF THE SEVERAL VIEWS OF THE DRAWINGS

FIG. 7 is a partial schematic of the refrigeration or air conditioning system of FIG. 2, but which incorporates a magnetic float sensor for detecting the presence of vaporous refrigerant at the pump inlet, coupled with a switch to inactivate the pump.

FIG. 8 is an enlarged view of the magnetic float sensor shown in FIG. 7.

FIG. 9–10 are schematics of the the circuitry and operation of the float transducer portion of the magnetic float sensor.

DETAILED DESCRIPTION OF PREFERRED EMBODIMENTS

Figure 1:
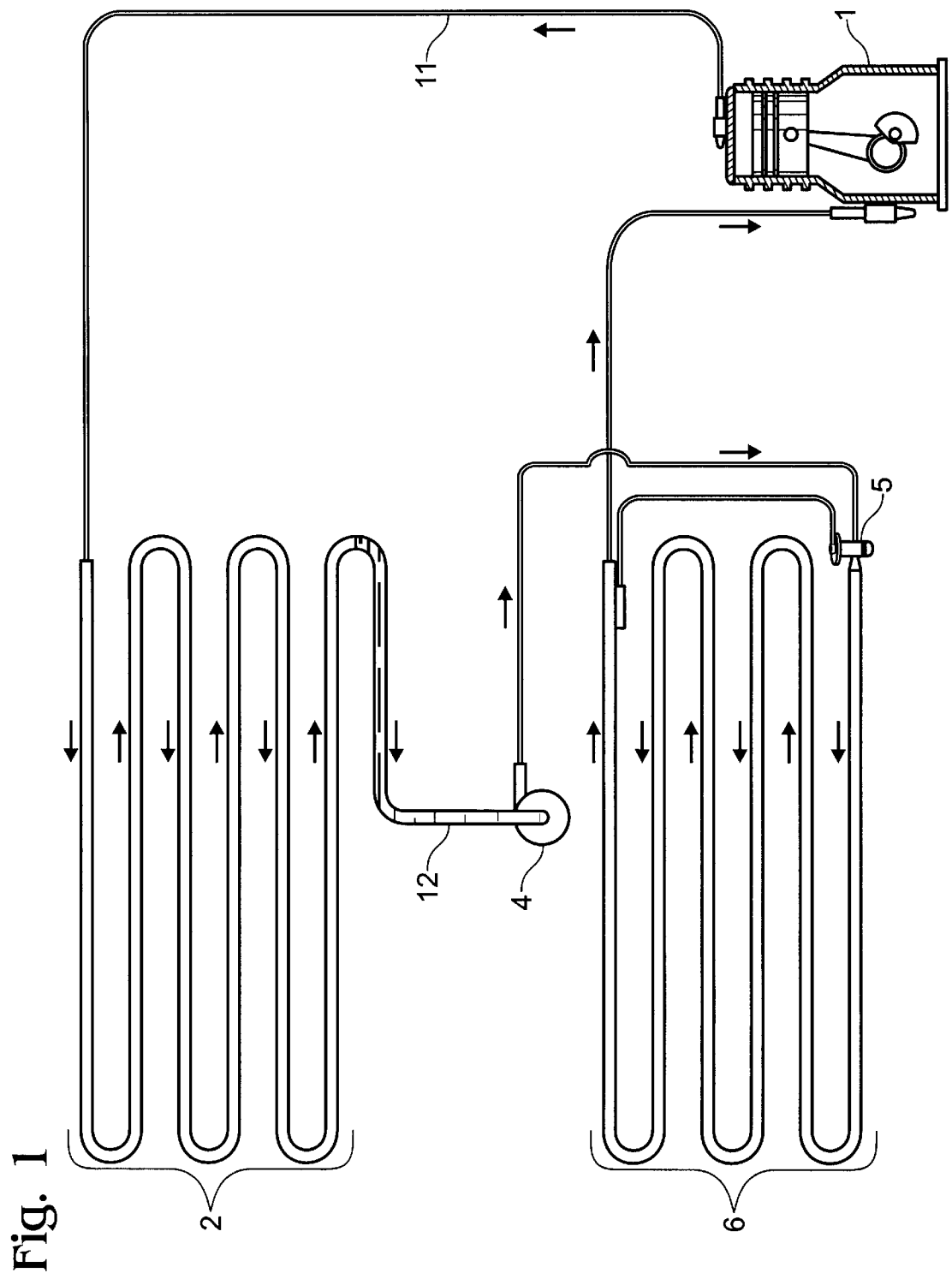
FIG. 1 is a schematic of a conventional refrigeration or air conditioning system which incorporates a compressor, a condenser, a refrigerant pump, an expansion device, and an evaporator.

Referring now to the drawings, wherein like numerals refer to the same elements, in FIG. 1 there is depicted a conventional refrigeration or air conditioning system wherein the cross-hatched area represents liquid refrigerant, the system including a compressor 1, a condenser 2, a liquid refrigerant pump 4, an expansion device 5, and an evaporator 6. In operation, compressor 1 compresses refrigerant vapor leaving evaporator 6. The compressed refrigerant flows to condenser 2 where air or other cooling fluid flows over condenser 2, thereby removing heat from the compressed vapor and causing condensation of the vapor into liquid refrigerant, which then exits through line 12 directly into refrigerant pump 4.

Figure 2:
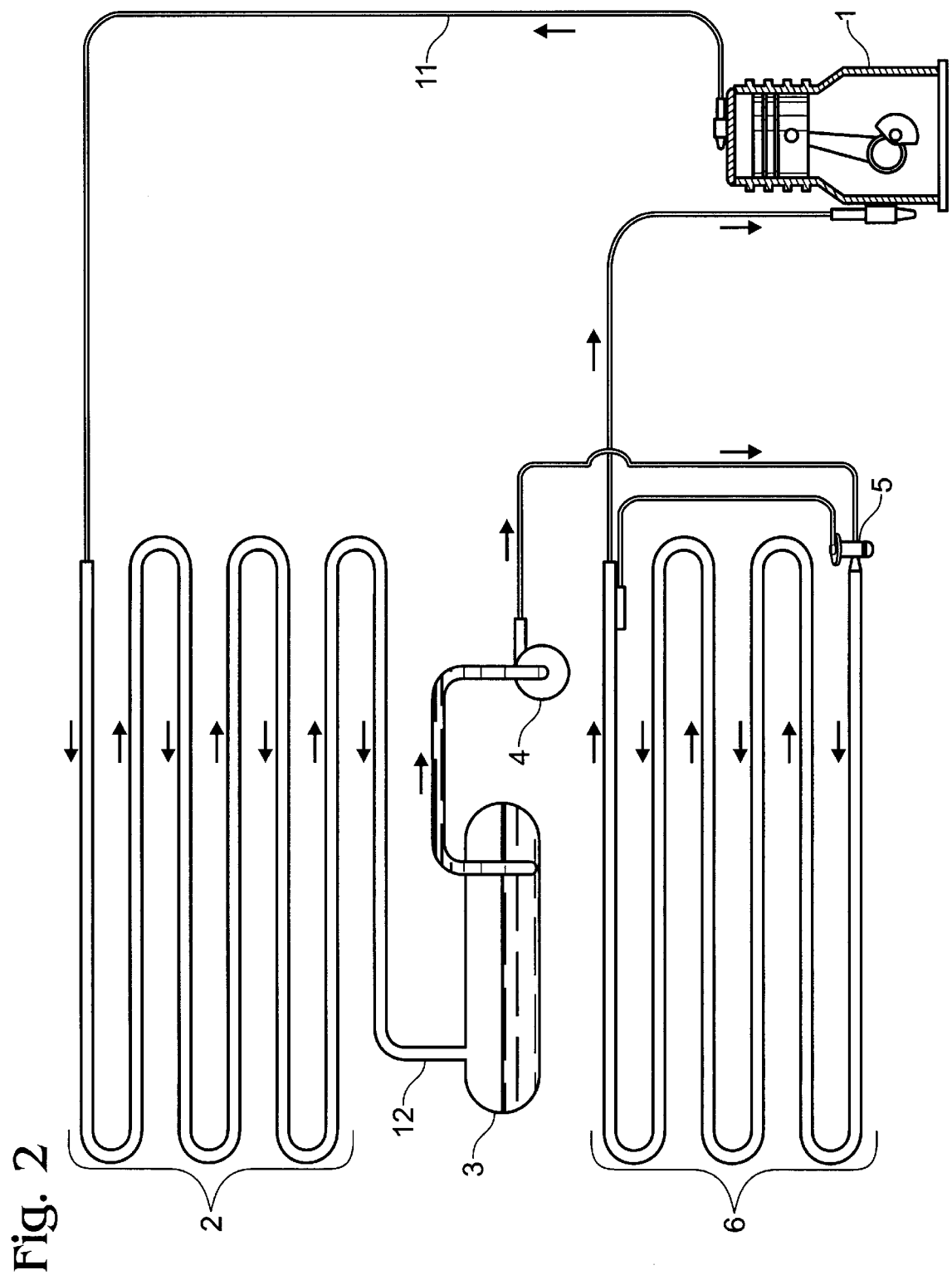
FIG. 2 is a schematic of the same conventional system depicted in FIG. 1, but which also incorporates a receiver.
Figure 4:
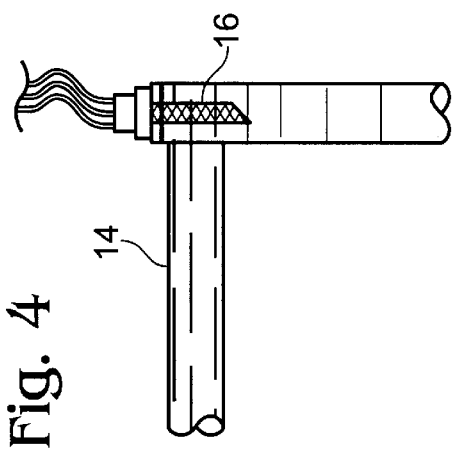
FIG. 4. is an enlarged view of the sonic sensor shown in FIG. 3.

In FIG. 2 there is shown essentially the same system as depicted in FIG. 1 except that a receiver 3 is interposed between condenser 2 and refrigerant pump 4, the receiver simply storing excess liquid refrigerant; liquid refrigerant is supplied to pump 4 via line 14.

In both systems depicted in FIGS. 1 and 2, refrigerant may leave condenser 2 at or near saturation. Systems are normally designed to provide an NPSH as discussed above, to reduce the likelihood of the condensed refrigerant vaporizing or "flashing" as it flows through conduit 14 and into pump 4. As also discussed above, vaporization of the condensed refrigerant can nonetheless occur under certain circumstances. In a system according to the present invention, pump 5 is protected against cavitation damage in such instances by a means for detecting vaporization of the refrigerant and for promptly deactivating pump 4 when and if such vaporization occurs. In addition, possible damage to the pump is prevented that might otherwise result from loss of lubrication provided by the liquid refrigerant.

Figure 3:
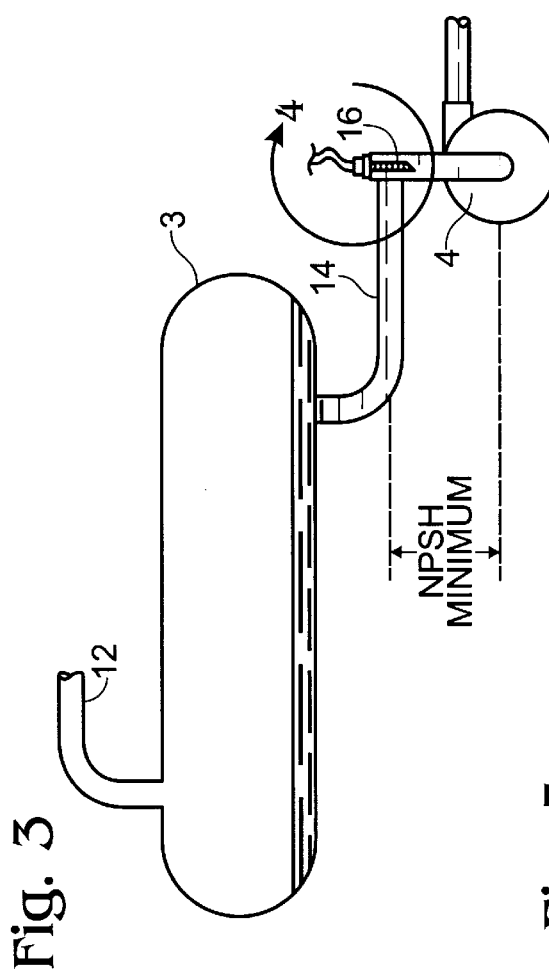
FIG. 3 is a partial schematic of the refrigeration or air conditioning system of FIG. 2, but which incorporates a sonic sensor for detecting the presence of vaporous refrigerant at the pump inlet, coupled with a switch to inactivate the pump.
Figure 6:
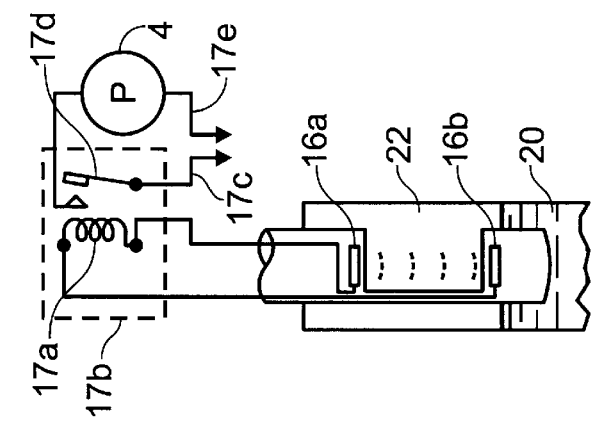
FIG. 5–6 are schematics of the circuitry and operation of the sonic transducer portion of the sonic sensor.
Figure 5:
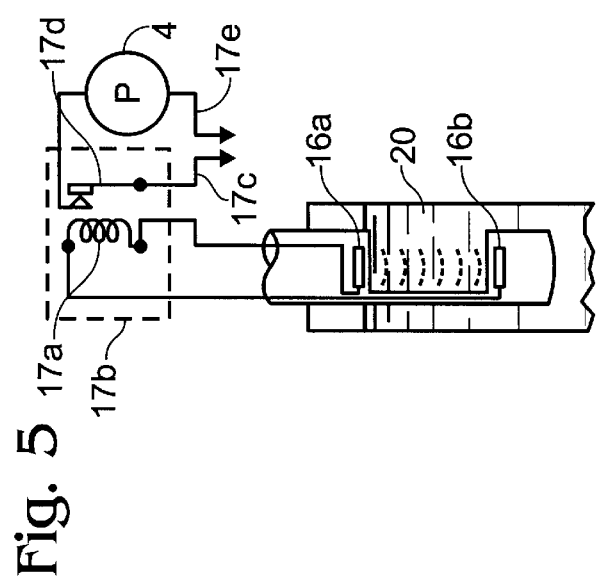
Figure 12:
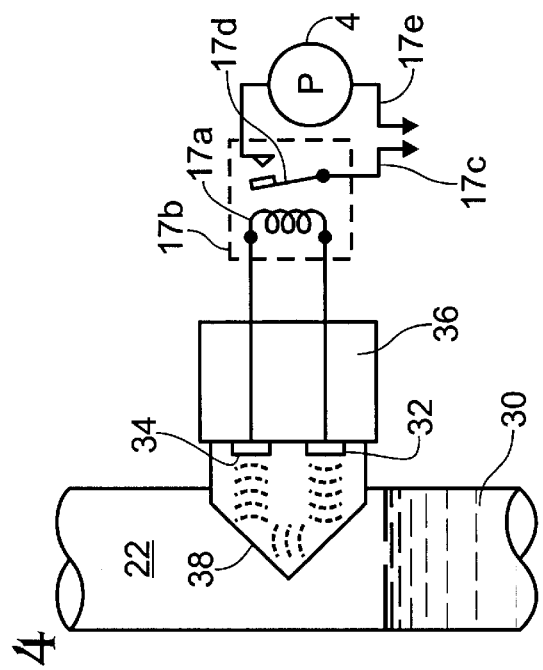
FIG. 12 is an enlarged view of the optical sensor shown in FIG. 11.
Figure 11:
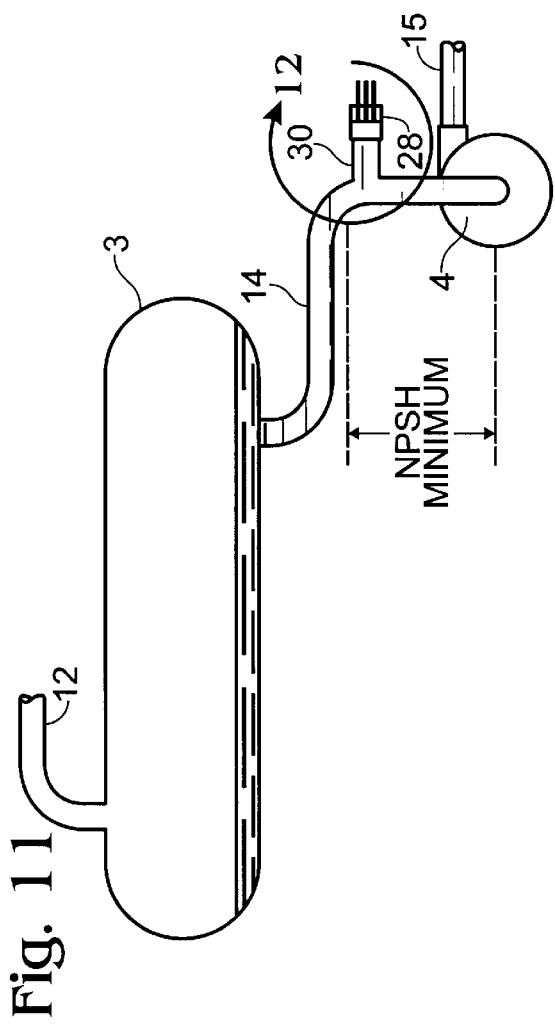
FIG. 11 is a partial schematic of the refrigeration or air conditioning system of FIG. 2, but which incorporates an optical sensor for detecting vaporous refrigerant at the pump inlet, coupled with a switch to inactivate the pump.
Figure 14:
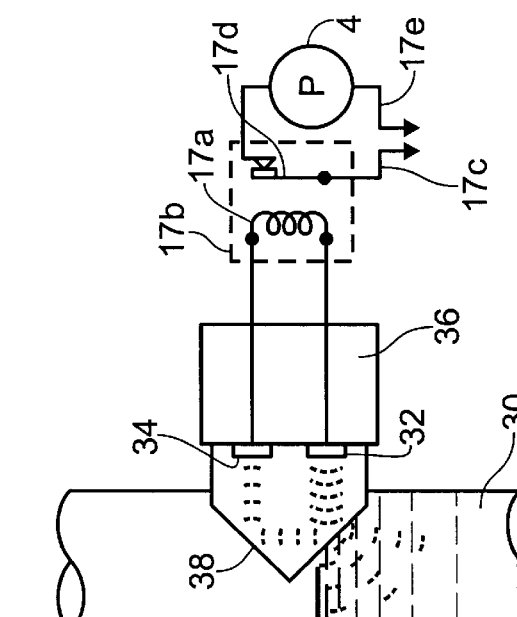
FIG. 13–14 are schematics of the circuitry and operation of the optical transducer portion of the optical sensor.
Figure 13:
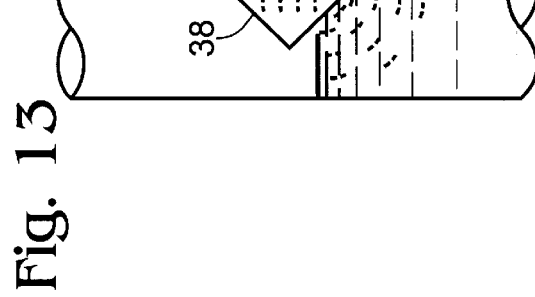

One embodiment of the present invention is depicted in FIG. 3, wherein there is shown a sonic transducer 16 in line 14 which supplies liquid refrigerant to pump 4. Ultrasonic sound waves generated by the sonic transducer 15 are enhanced in liquid refrigerant, while they are attenuated in a gaseous or vaporous medium such as vaporous refrigerant, schematically depicted in FIGS. 5 and 6, respectively, wherein 20 generally indicates liquid refrigerant and 22 indicates vaporous refrigerant. In FIGS. 3A and 3B, sonic transducer 16 is shown as comprising the operative components of an ultrasonic wave-generating transmitting crystal 16a, an ultrasonic wave-detecting receiver crystal 16b, and an electrical circuit that includes a coil 17a, a relay circuit 17b, a control circuit 17c and a solenoid switch 17d, with the pump 4 being connected to a power source 17e. Such sonic transducers are commercially available from AC&R Components of Chatham, Ill.

As is apparent, sonic transducer 16 is capable of detecting whether the refrigerant entering pump 4 is in a liquid or vaporous state. When pump 4 is included within the electrical circuit, the liquid/vaporous state of the refrigerant is detected. Switch 17d is closed when liquid refrigerant 20 is present, thereby supplying electrical power to the pump to permit it to operate normally. When the refrigerant vaporizes to become vapor 22, switch 17d is opened, thereby disconnecting the power supply to the pump and deactivating it. Upon resumption of the supply of liquid refrigerant, switch 17d is again closed, permitting reactivation of the pump. Although solenoid switching has been described, it is to be understood that any type of electrical switching would be satisfactory. The location of sonic transducer 16 above the entrance of pump 4 should conform to that liquid level needed to assure proper NPSH for the pump.

Another embodiment of the invention is depicted in FIGS. 7–10, wherein there is shown a float transducer 23 positioned in fluid channel 18 that is in fluid communication with line 14 so as to permit the liquid refrigerant level in channel 18 to mirror the level in conduit 14. Float transducer 23 includes a float 24 which rises and falls with the level of liquid refrigerant in channel 18. If float 24 falls below a predetermined level, it opens magnetic switch 26 in the solenoid-switched electrical circuit, which interrupts power to pump 4. Float 24 will float only in liquid refrigerant 20 and not in vaporous refrigerant 22. If the refrigerant is vaporous then float 24 will drop and the magnetic switch 26 will open, thus interrupting the power to pump 4. When liquid refrigerant 20 refills conduit 14 and channel 18, magnetic switch 26 closes and restores power to pump 4. Such float transducers are commercially available as the RLM series from Watsco Components of Hialeah, Fla.

A third embodiment of the invention is depicted in FIGS. 11–14 which shows the inclusion of an optical transducer 28 in a branch 30 of line 14. The operative components of optical transducer 28 include a light-emitting diode (LED) 32 and a receiver 34 in a relay module 36, a prism 38 for reflection or refraction of light from LED 32 and an electrical circuit having a solenoid switch 17d. Such optical transducers are commercially available as either the Gems ELS Series (Gem Products of Garden Grove, Calif.) or as the S-9400 Series from AC&R Components, Inc. In operation, light from transducer 28 travels into liquid refrigerant 20 and is refracted out into the liquid, allowing virtually no light to reach receiver 34. When no liquid refrigerant is present, i.e., when the refrigerant is in a vaporous state 22, light is reflected by prism 38 back to receiver 34. Receiver 34 therefore senses the state of refrigerant in liquid or vaporous form and actuates electronic switching in the circuit to open or close switch 17d to thereby either deactivate or activate the pump. The location of the transducer 28 above the pump entrance should conform to that liquid level needed to assure the proper NPSH for the pump.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. In a vapor-compression refrigeration apparatus utilizing a fluid refrigerant and comprising a compressor, a condenser, a liquid refrigerant pump, an expansion device, and an evaporator, the improvement comprising:

vapor detection means for detecting the presence of vapor at or near the inlet of said liquid refrigerant pump and for deactivating said pump in response to the detection of vapor.

2. The apparatus of claim 1, including liquid refrigerant detection means for detecting the presence of liquid refrigerant at or near said inlet and for activating said pump in response to the detection of liquid.

3. The apparatus of claim 1 wherein said vapor detection means comprises a sonic transducer.

4. The apparatus of claim 2 wherein said liquid refrigerant detection means comprises a sonic transducer.

5. The apparatus of claim 1 wherein said vapor detection means comprises a float transducer.

6. The apparatus of claim 2 wherein said liquid refrigerant detection means comprises a float transducer.

7. The apparatus of claim 1 wherein said vapor detection means comprises an optical transducer.

8. The apparatus of claim 2 wherein said liquid refrigerant detection means comprises an optical transducer.

\* \* \* \* \*

UNITED STATES PATENT AND TRADEMARK OFFICE
CERTIFICATE OF CORRECTION

PATENT NO. : 6,145,332
DATED : November 14, 2000
INVENTOR(S) : Robert E. Hyde

Page 1 of 1

It is certified that error appears in the above-identified patent and that said Letters Patent is hereby corrected as shown below:

Column 3,
Line 37, delete "3A and 3B" and insert -- 5 and 6 --

Signed and Sealed this

Sixteenth Day of April, 2002

*Attest:*

JAMES E. ROGAN
*Director of the United States Patent and Trademark Office*

*Attesting Officer*